March 22, 1949.
J. W. TOOKE ET AL
2,465,047
AZEOTROPIC DISTILLATION OF C₄
ACETYLENES FROM BUTENE-2
Filed Sept. 23, 1946
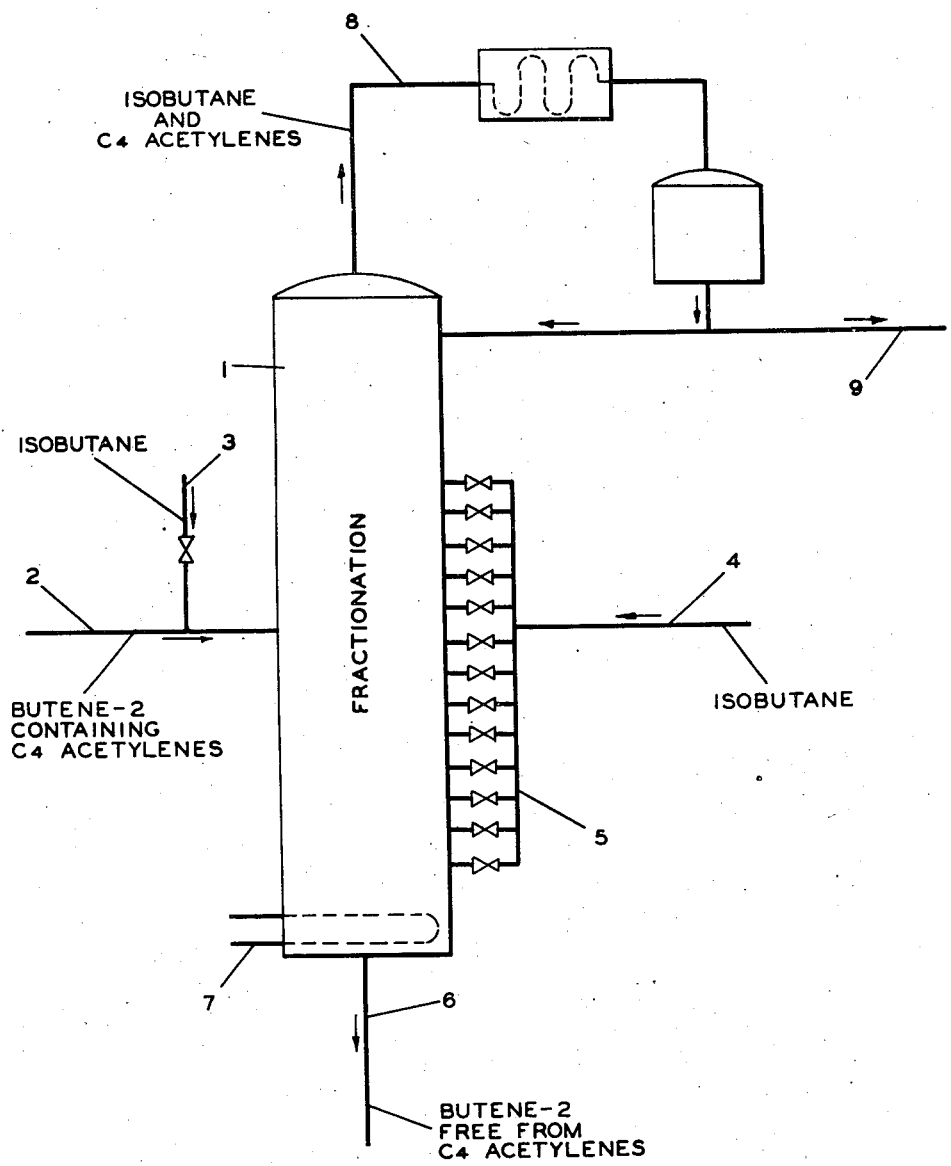
INVENTOR.
J.W. TOOKE
E.Z. LANG, Jr.
BY
Hudson and Young
ATTORNEYS Patented Mar. 22, 1949

2,465,047

UNITED STATES PATENT OFFICE 2,465,047

AZEOTROPIC DISTILLATION OF C₄ ACETYLENES FROM BUTENE-2

James W. Tooke and Erstine Z. Lang, Jr., Bartlesville, Okla., assignors to Phillips Petroleum Company, a corporation of Delaware Application September 23, 1946, Serial No. 698,630

8 Claims. (Cl. 202—42)

The invention relates to purification of butene-2 and more particularly to treatment of butene-2 contaminated with $C_4$ acetylene hydrocarbon to remove such acetylene hydrocarbon.

Contamination of butene-2 with $C_4$ acetylenes is a very serious problem. These $C_4$ acetylene hydrocarbon impurities appear to be formed as the result of side reactions which accompany the production of butene-2 by catalytic and thermal (non-catalytic) methods such as catalytic dehydrogenation, pyrolysis, cracking, etc. The $C_4$ acetylene hydrocarbon impurities boil in the same range as the butene-2 with which they are associated, and by reason of their close boiling point and/or formation of azeotropes with butene-2, it is impossible to separate them by ordinary fractional distillation.

Heretofore it has been impossible to produce, by high temperature processes such as catalytic or non-catalytic dehydrogenation, pyrolysis, cracking and the like, butene-2 which was sufficiently free from $C_4$ acetylenes to enable its use for the calibration of instruments such as spectrophotometers used in the aviation gasoline and synthetic rubber industries. Our invention provides a simple, economical and certain method of producing butene-2 of this extreme purity.

The principal object of the present invention is to provide an improved method of separating $C_4$ acetylenes from butene-2 contaminated therewith. Another object is to provide a simple, economical and positive method of removing such $C_4$ acetylene hydrocarbon impurities from butene-2. Another object is to provide a method of making butene-2 of such freedom from $C_4$ acetylenes that it is suitable for the calibration of analytical and control instruments such as spectrophotometers used in the processing of light hydrocarbon streams for the manufacture of aviation gasoline and synthetic rubber components. Numerous other objects will be apparent to those skilled in the art from this disclosure.

The accompanying drawing portrays diagrammatically one arrangement of equipment which may be used for the practice of our invention.

In accordance with our invention $C_4$ acetylene hydrocarbons are removed from butene-2 contaminated therewith by fractionally distilling the butene-2 contaminated with $C_4$ acetylene hydrocarbon in the presence of isobutane and taking overhead an azeotrope of the $C_4$ acetylene hydrocarbon with isobutane.

The $C_4$ acetylene hydrocarbons which are removed from butene-2 in accordance with our invention may be ethylacetylene, vinylacetylene or biacetylene (butadiyne-1,3). The boiling points of the butenes-2 and of these $C_4$ acetylenes may be tabulated as follows:

| Hydrocarbon | Normal Boiling Point, °F. |
|---|---|
| Butene-2 (trans) | 33.6 |
| Butene-2 (cis) | 38.5 |
| Vinylacetylene | 41.2 |
| Ethylacetylene | 47.8 |
| Biacetylene | 49.6 |

As indicated above, separation of butene-2 from the $C_4$ acetylenes commonly found as contaminants therein by conventional means such as fractional distillation is practically impossible by reason of the formation of azeotropes between the isomers of butene-2 and vinylacetylene, ethylacetylene and biacetylene. The present invention is based on the discovery that this separation may be accomplished in a very simple and economical manner by fractionally distilling the butene-2 contaminated with $C_4$ acetylenes in the presence of isobutane whereby there are formed azeotropes between isobutane and the $C_4$ acetylenes, these azeotropes being of the minimum-boiling type and boiling sufficiently below the azeotropes formed between butene-2 (either isomer) and the $C_4$ acetylenes to be readily separable therefrom by fractional distillation.

Ethylacetylene is the $C_4$ acetylene most commonly encountered as an impurity in butene-2. Vinylacetylene is the next most common $C_4$ acetylene impurity in butene-2. Biacetylene is the least common impurity found. Our invention is applicable whether the $C_4$ acetylene impurity be ethylacetylene, vinylacetylene, biacetylene or any other $C_4$ acetylene, and whether the $C_4$ acetylenes are present singly or in any combination or two or more.

The amount of isobutane used in accordance with the present invention should be at least sufficient to enable essentially complete separation of the $C_4$ acetylene hydrocarbon impurity from the butene-2. The isobutane enables the maintenance of a control temperature in the column, i. e., permits the distillation to be carried out with control of the distilling temperature. Any excess of isobutane must of course be taken overhead or left in the column. Ordinarily we prefer to prevent any such excess isobutane from going out in the bottoms product by reboiling the bottom of the column in the usual manner in order to drive out any isobutane contained therein. Thus any excess isobutane is held in the column until it can go overhead in the form of an azeotrope or azeotropes with the C₄ acetylene hydrocarbon impurity. If desired, a portion or all of any such excess isobutane may be allowed to go overhead as such.

Generally speaking we have found that the amount of isobutane should be at least ten times the amount of C₄ acetylenes present in the butene-2 being purified. This amount is on a weight basis although on a molar basis the ratio of isobutane to C₄ acetylene would be substantially the same i. e. at least 10:1. We have found that the use of isobutane in this amount enables the complete separation of C₄ acetylene from butene-2, especially when a batch type distillation is conducted. In a continuous operation, a substantially greater amount of isobutane may have to be used since as is well known absolutely complete separation may be obtained by batch distillation whereas it may not be obtained in continuous operation because of equilibrium considerations.

Usually we limit the amount of isobutane so that the weight ratio of isobutane to C₄ acetylene does not exceed 15:1. Preferably this ratio is not over 12:1. Limitation of the excess of isobutane over that required to separate the C₄ acetylene is desirable in order to avoid the expense and trouble of distilling a large excess of isobutane, either in the acetylene-removal distillation or in a subsequent distillation applied to the resulting kettle product to separate butene-2 from isobutane left therein.

The extent of removal of C₄ acetylene from butene-2 in accordance with our invention will of course depend upon a number of factors including the amount of isobutane employed, distillation conditions, whether a batch type or a continuous operation is employed, etc. As indicated above, absolutely complete removal of C₄ acetylene from butene-2 may be effected by by means of the present invention if a batch type operation is employed. In any event our invention is usually carried out in such manner that the C₄ acetylene content of the resulting butene-2 does not exceed 0.01 weight per cent.

As indicated above our invention may be conducted either in a batchwise or in a continuous manner. In a batchwise operation, the C₄ acetylenes in the original butene-2 concentrate may be concentrated in the first material overhead in a regular fractional distillation by adding to the kettle a quantity of isobutane which forms with the acetylene or acetylenes an azeotrope or azeotropes having a lower boiling point than the butene-2, the C₄ acetylene hydrocarbons, or the azeotropes formed between the butene-2 and the C₄ acetylene hydrocarbons. Therefore the first material overhead in such a fractional distillation is a mixture of isobutane, isobutane-C₄ acetylene hydrocarbon azeotrope or azeotropes and usually very small quantities of the butene-2. As the distillation proceeds the C₄ acetylene hydrocarbons are removed with the isobutane and the butene-2 remains as an essentially C₄ acetylene hydrocarbon-free material.

The pressure at which the distillation in accordance with the present invention is conducted may vary over wide limits but ordinarily will fall within the range of from atmospheric to 100 pounds per square inch gauge. In commercial operation the pressure will be that commonly used for distilling aliphatic C₄ hydrocarbons, say 50 to 70 pounds per square inch gauge. Use of such pressures enables the use of ordinary cooling water available at refineries and gasoline plants to condense the overhead to provide reflux instead of having to resort to expensive refrigeration as would be required were pressure in the neighborhood of atmospheric employed.

Referring to the drawing, a feed of butene-2 containing C₄ acetylene is charged to fractional distillation column 1 via line 2. If desired isobutane in the required amount indicated above may be admixed with the feed via line 3. Alternatively the isobutane may be introduced via line 4 connected to column 1 by means of a manifold 5 permitting introduction of the isobutane at any one or a plurality of points vertically along column 1. In a continuous operation it is preferred that the isobutane be added at a point sufficiently above the bottom of column 1 that substantially no isobutane appears in the bottoms product which is withdrawn via line 6. This bottoms product is reboiled in the usual manner by reboiler 7 and is essentially or completely free from C₄ acetylenes. An overhead product of isobutane and the C₄ acetylene is withdrawn via line 8 and condensed in the usual way, a portion of the liquid condensate being returned to the top of column 1 in the usual way to serve as reflux. The balance of the liquid condensate is withdrawn via line 9.

If desired the overhead product containing isobutane and the C₄ acetylenes derived from the feed may be treated in any suitable manner (not shown) to recover isobutane which may be returned to the column 1. This separation may yield a concentrate of the C₄ acetylene impurity which may be used for any desired purpose. Likewise if the bottoms product of butene-2 withdrawn via line 6 contains isobutane in appreciable amount, it may be subjected to fractional distillation to separate any such isobutane and give a substantially pure butene-2 product.

*Example*

A butene-2 concentrate containing approximately 3.7 weight percent of C₄ acetylene hydrocarbons (principally ethylacetylene) was fractionally distilled in a batchwise manner at atmospheric pressure. The first cuts overhead were of high C₄ acetylene content and this content decreased until at 87 per cent of the total overhead, C₄ acetylene hydrocarbon no longer was present.

A composite of the first few cuts overhead from the distillation described in the preceding paragraph and which contained approximately 8.6 weight per cent of C₄ acetylenes and which mounted to about 20.5 per cent of the original butene-2 charge was then distilled after first adding isobutane thereto. The weight of the composite was 590 pounds and the amount of isobutane added thereto prior to the distillation was 513 pounds. Thus the amount of isobutane was $$\frac{513}{590 \times 0.086}$$

or about ten times that of the acetylenes present. The resulting mixture was distilled in a batchwise fashion as before. Of the composite charge (and disregarding isobutane present) about 35 per cent of the charge was obtained as acetylenes-free butene-2.

The following table gives the data of the two distillations described above:

|  | Run No. 1, Straight Fractionation of Butene-2 Concentrate | Run No. 2, Distillation of Butene-2 Concentrate in Admixture with Isobutane |
|---|---|---|
| Per Cent Acetylenes in Original Butene-2 Concentrate | 3.67 | 8.65 |
| Per cent of original butene-2 feed removed at— | | |
| 10% of total acetylenes removed | 3.8 | 1.5 |
| 20% of total acetylenes removed | 7.0 | 2.7 |
| 30% of total acetylenes removed | 10.4 | 3.9 |
| 40% of total acetylenes removed | 12.3 | 5.5 |
| 50% of total acetylenes removed | 17.8 | 7.3 |
| 60% of total acetylenes removed | 21.4 | 9.9 |
| 70% of total acetylenes removed | 26.3 | 14.0 |
| 80% of total acetylenes removed | 32.6 | 23.5 |
| 90% of total acetylenes removed | 44.3 | 35.8 |
| 95% of total acetylenes removed | 50.0 | 44.2 |
| 100% of total acetylenes removed | 87.4 | 65.0 |

It will be seen from the above that straight fractionation alone (that is in the absence of isobutane) yielded only about 13 weight per cent of the original charge as acetylenes-free material. By rerunning a portion of this and using the principles of the present invention an additional 35 per cent of 20.5 per cent or 7 per cent of the original feed was recovered acetylene-free. This then is an improvement of about 55 per cent over the straight fractionation. It should be pointed out that the conditions in this particular case were such as to give the least improvement over the straight fractionation since the feed chosen for the second distillation was the material of highest acetylenes content obtained from the straight fractionation.

As used herein the term "butene-2" is intended to denote either the cis or the trans isomer or a mixture of the two isomers in any proportion, unless the context denotes otherwise.

We claim:

1. The method of purifying butene-2 contaminated with $C_4$ acetylene hydrocarbon impurity having a normal boiling point higher than that of said butene-2 which comprises fractionally distilling said butene-2 contaminated with $C_4$ acetylene hydrocarbon in the presence of isobutane and taking overhead an azeotrope of said $C_4$ acetylene hydrocarbon impurity with isobutane.

2. The method of purifying butene-2 contaminated with $C_4$ acetylene hydrocarbon impurity having a normal boiling point higher than that of said butene-2 which comprises fractionally distilling said butene-2 contaminated with $C_4$ acetylene hydrocarbon in the presence of isobutane and taking overhead substantially all of the $C_4$ acetylene hydrocarbon in admixture with isobutane and leaving butene-2 essentially free from $C_4$ acetylene hydrocarbon as the kettle product.

3. The method of purifying butene-2 contaminated with $C_4$ acetylene hydrocarbon impurity having a normal boiling point higher than that of said butene-2 which comprises fractionally distilling said butene-2 contaminated with $C_4$ acetylene hydrocarbon in the presence of isobutane in an amount at least equal to ten times the weight of $C_4$ acetylene present in the said butene-2 and taking overhead said $C_4$ acetylene hydrocarbon as an azeotrope with isobutane.

4. The method of purifying butene-2 contaminated with ethylacetylene which comprises fractionally distilling said butene-2 contaminated with ethylacetylene in the presence of isobutane and taking overhead an azeotrope of said ethylacetylene with isobutane.

5. The method of purifying butene-2 contaminated with vinylacetylene which comprises fractionally distilling said butene-2 contaminated with vinylacetylene in the presence of isobutane and taking overhead an azeotrope of vinylacetylene with isobutane.

6. The method of purifying butene-2 contaminated with $C_4$ acetylene hydrocarbon impurity having a normal boiling point higher than that of said butene-2 which comprises fractionally distilling said butene-2 contaminated with $C_4$ acetylene hydrocarbon in the presence of isobutane in an amount such that the weight ratio of isobutane to $C_4$ acetylene present is at least 10:1 and is not over 15:1 and taking overhead said $C_4$ acetylene hydrocarbon as an azeotrope with isobutane and leaving butene-2 essentially free from $C_4$ acetylene as the kettle product.

7. A process according to claim 6 wherein butene-2 in the kettle product contains no more than 0.01 weight per cent $C_4$ acetylene hydrocarbon impurity.

8. A process according to claim 6 wherein distillation is effected at a pressure within the range of atmospheric to 100 pounds per square inch gauge.

JAMES W. TOOKE.
ERSTINE Z. LANG, Jr.

REFERENCES CITED

The following references are of record in the file of this patent:

UNITED STATES PATENTS

| Number | Name | Date |
|---|---|---|
| 2,371,350 | Nutting et al. | Mar. 13, 1945 |
| 2,371,860 | Walls et al. | Mar. 20, 1945 |
| 2,408,947 | Nutting et al. | Oct. 8, 1946 |